(12) United States Patent
Schreiber

(10) Patent No.: US 8,597,435 B2
(45) Date of Patent: Dec. 3, 2013

(54) AQUA COMB

(76) Inventor: Mark Allen Schreiber, Sarasota, FL (US)

(*) Notice: Subject to any disclaimer, the term of this patent is extended or adjusted under 35 U.S.C. 154(b) by 919 days.

(21) Appl. No.: 12/798,013

(22) Filed: Mar. 29, 2010

(65) Prior Publication Data

US 2011/0232699 A1    Sep. 29, 2011

(51) Int. Cl.
- *B08B 3/00* (2006.01)
- *B08B 3/12* (2006.01)
- *B08B 6/00* (2006.01)

(52) U.S. Cl.
USPC ........ 134/166 R; 134/34; 134/43; 134/167 R; 134/172; 134/178; 134/180; 134/182; 134/183; 134/198; 134/199

(58) Field of Classification Search
USPC ...... 134/34, 43, 166 R, 167 R, 172, 178, 180, 134/182, 183, 198, 199
See application file for complete search history.

(56) References Cited

U.S. PATENT DOCUMENTS

| | | | |
|---|---|---|---|
| 2002/0011259 A1* | 1/2002 | Pociask | 134/34 |
| 2008/0028556 A1* | 2/2008 | Papenfuss | 15/142 |
| 2009/0056753 A1* | 3/2009 | Heathcote et al. | 134/16 |
| 2010/0037926 A1* | 2/2010 | Bunting et al. | 134/166 R |

FOREIGN PATENT DOCUMENTS

JP    01304067 A * 12/1989

OTHER PUBLICATIONS

Visit www.amazon.com, then search for "Water Wand Pool Filter Cartridge Cleaner", Nov. 5, 2012.
Visit www.amazon.com, then search for "Pool Filter Cleaning Wand", Nov. 5, 2012.
Visit www.amazon.com, then search for "Filter Flosser Tool", Nov. 5, 2012.
Visit www.spaandpoolstore.com, then search for "Power Pic" Nov. 5, 2012.

* cited by examiner

*Primary Examiner* — Michael Barr
*Assistant Examiner* — Charles W Kling
(74) *Attorney, Agent, or Firm* — Dorothy S. Morse

(57) ABSTRACT

An aqua comb typically used with a garden hose for thoroughly and quickly cleaning reusable pleated pool water filters and like filter cartridges having a pleated configuration. The aqua comb comprises four design elements: 1) a rotating hose nut with internal seal that is employed for leak-resistant attachment of the aqua comb to various hose endings, 2) an on/off valve for fluid flow control, 3) an elongated and rigid fluid spray body with fluid discharge openings, and 4) a semi-rigid comb member with long fingers. The core design element of the aqua comb is the combined presentation angle and physical design shape of its comb member which works in concert with the fluid spray discharged from the fluid spray openings in its elongated spray body to multiply and leverage mechanical cleaning action even in the valleys between filter pleats.

20 Claims, 2 Drawing Sheets

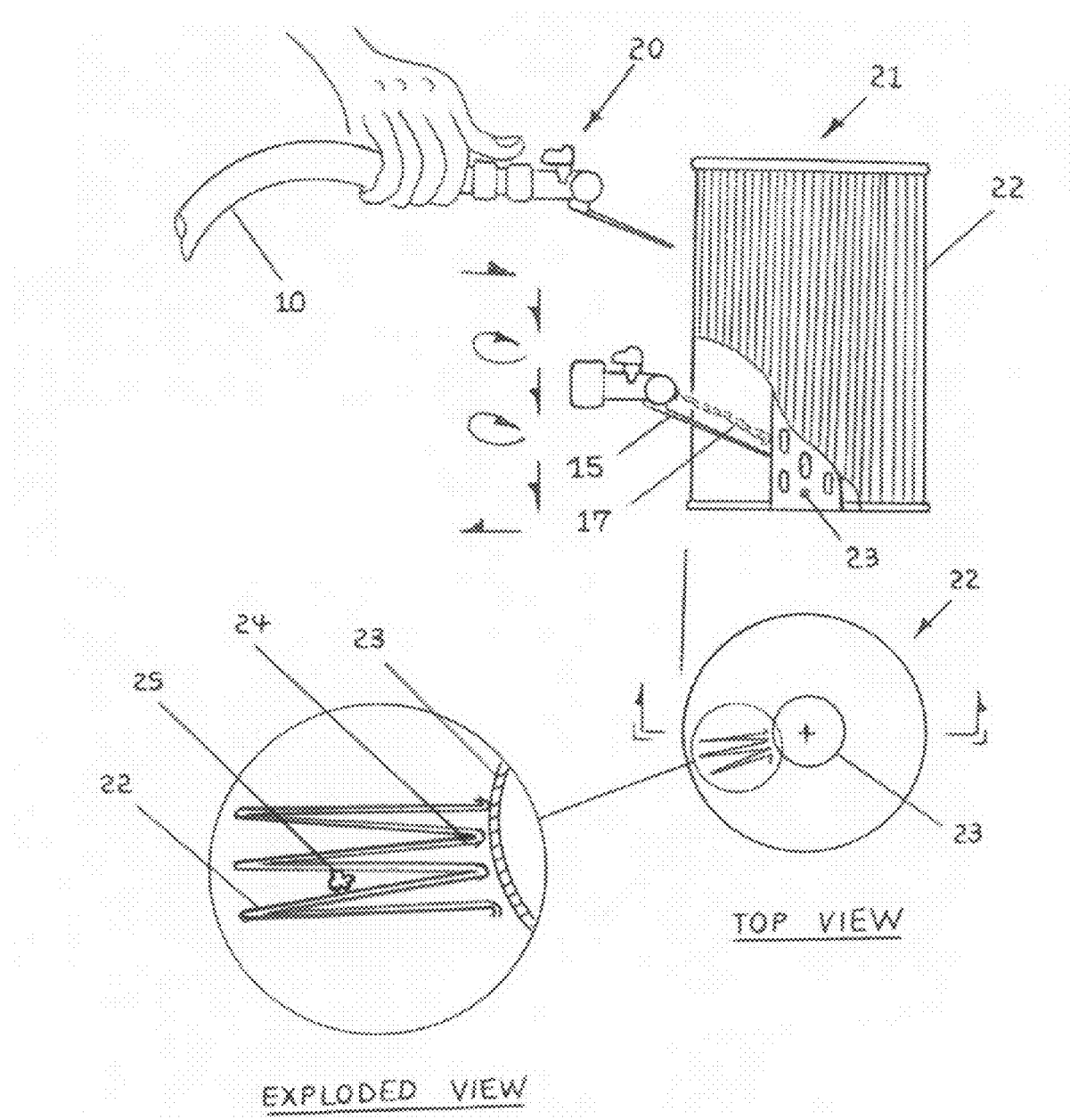

AQUA COMB

BACKGROUND

Description of the Related Art

Although water spray from a hose and pleat-separating mechanical devices such as screwdrivers are known for use in cleaning reusable pool water filters, and the water spray and mechanical devices may be used separately or together to clean pool water filters or like design filter cartridges having a pleated construction, pool filter cleaning methods employing these devices are not fast, effective, or easy to use. In contrast, the wide, flat pattern of the fluid spray in the present invention aqua comb, in combination with the long and semi-rigid fingers of its comb member, is able to better reach between pleats of filter material and into the filter's valleys (the innermost folded portion of the filter material between pleats shown in FIG. 3) to mechanically dislodge debris from the sides of the folded pleats and the valleys, cleaning them effectively, easily, and quickly, and without damaging the filter material. Other known pleated filter cartridge cleaning methods and tools include devices referred to as a filter flosser (it has an arcuate tube with a plurality of fluid spray openings directed away from its handle and toward a focal point in front of the tube), a filter cleaning wand (it has a fluid spray head with multiple fluid discharge openings on its distal end), and a water wand (it has a row of short, rigid, paddle-like fingers positioned above multiple fluid openings, the fingers acting as a splash guard and partially opening filter pleats so that water can get between them, in contrast to the long and semi-rigid fingers of the present invention that are sufficiently long to reach into the valleys between filter pleats to mechanically dislodge debris therefrom and are also positioned below fluid spray openings to receive fluid spray discharged from the fluid openings and make certain fluid travels fully into the valleys between pleated folds to achieve a thorough cleaning and flushing thereof after the mechanical dislodging takes place). The short, rigid, paddle-like fingers of the water wand simply pry open pleats to allow water in between them, but since the water is sprayed between pleats below the rigid, paddle-like fingers, they do not deliver water into the valleys between pleats (the most difficult areas to clean) and the short, rigid, paddle-like fingers of the water wand are not long enough to reach the valleys to mechanically dislodge debris there from. All three of these prior art devices (filter flosser, filter cleaning wand, and water wand) clean the pleats of reusable pool water filter cartridges from the outside. A fourth known pleated filter cartridge cleaning tool referred to as a power pic is inserted into the center hole of the filter cartridge and cleans the filter's pleats from the inside out using high-pressure water flow. None have the same structure as the present invention and do not include a mechanical device similar to the present invention's long fingered and semi-rigid comb member that can reach into the valleys of the filter between pleats to mechanically dislodge debris from them.

BRIEF DESCRIPTION OF THE DRAWINGS

FIG. 3 illustrates a side elevation view of the most preferred embodiment of the aqua comb invention connected to a garden hose and held by a person's hand in a position close to the top end of a target reusable pool water filter having adjacent and slightly spaced-apart vertically-extending pleated rows of filter material, with a second representation of the aqua comb invention shown associated with a demonstrative cut-away portion of the pool water filter below the first representation with its comb member fingers interfaced with the filter's pleats and further showing that when the comb member fingers have the preferred presentation angle positioning, their length dimension is sufficient to reach the center tower about which folded/pleated filter material is positioned, with FIG. 3 further showing the pool water filter pleats in two additional insets, one inset being a top view of the pool water filter that shows the center tower and a portion of the filter material folded/pleated about it, with the second inset being an exploded view showing debris between pleats of filter material and the filter's hard-to-reach valleys that the second representation's long comb member fingers have sufficient length dimension to reach.

Referring to FIGS. 1, 2, and 3, the most preferred embodiment of the aqua comb invention 20 can be connected to a garden hose 10 and held by person's hand (not numbered) in a position close to a target reusable pool water filter 21 having a center tower 23 and an externally-pleated 22 construction. When the long and semi-rigid comb member fingers 15 of aqua comb 20 become interfaced with the pleats 22 of pool water filter 21, and water flows from garden hose 10 through rotating nut 11, through on-off valve 12, and is then discharged as a wide spray 17 from the fluid openings 14 in elongated spray body 13 onto the long comb member fingers 15 positioned below fluid spray openings 14, the water spray 17 on the semi-rigid comb member fingers 15 then travels fully into the valleys between pleats 22 wherein the combination of semi-rigid comb member fingers 15 and the water spray 17 carried thereon dislodges debris located between the pleats 22 of filter material of water filter 21, as well as the dirt, algae, and other debris 25 that has been collected in the hard-to-reach valleys 24 of pool water filter 21, and accomplishes the dislodging without damaging the filter material. As seen from the top and side respectively in FIGS. 1 and 2, comb member fingers 15 are spaced-apart from one another and each have a distally-narrowing configuration. As further shown in FIG. 3, in combination with a length dimension for comb member fingers 15 that is greater than the depth dimension needed to reach the valleys 24 between pleats 22, the distally-narrowing configuration of comb member fingers 15 allows them to reach all the way into valleys 24 for mechanical dislodging of debris fully along the sides of pleats 22 all the way to and into valleys 24 while the water spray 17 above comb member fingers 15 wets debris 25 during mechanical dislodging and then with the assistance of gravity flushes dislodged debris 25 downwardly away from the portion of the pleats 22 just cleaned. The aqua comb 20 may have a spray body 13 made of metal, plastic or like rigid material. The spray body 13 may also have a width dimension to match that of comb member

Figure 1:
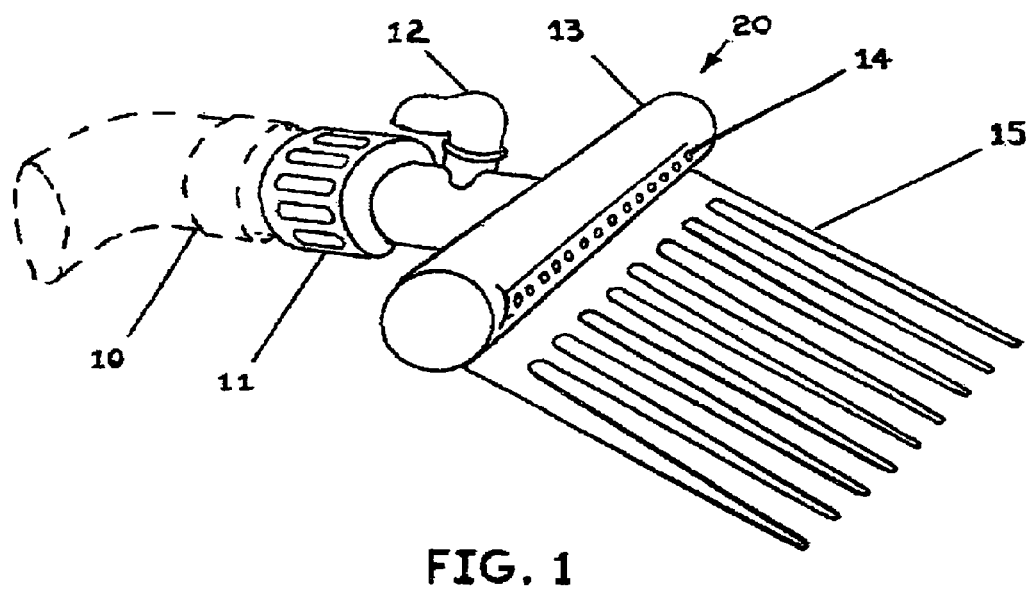
FIG. 1 illustrates a perspective elevation view from the top of the most preferred embodiment of the aqua comb invention showing an elongated spray body with a multiple fluid openings therethrough in longitudinal orientation, a comb member attached to the spray body at a preferred presentation angle and having a plurality of long semi-rigid comb fingers positioned to receive fluid spray discharged from the fluid openings in the spray body and deliver the fluid it carries into the valleys between filter pleats, an on-off valve, and a rotating nut allowing its connection to a garden hose.
Figure 2:
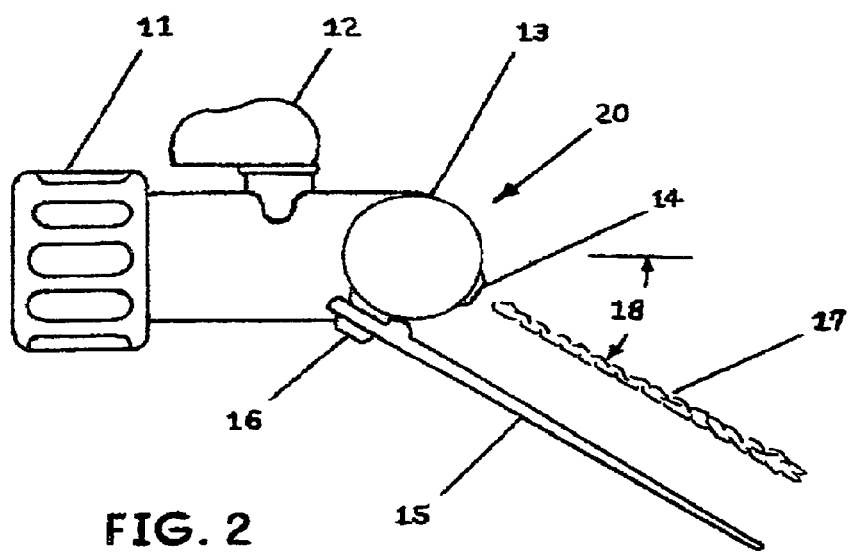
FIG. 2 illustrates a side elevation view of the most preferred embodiment of the aqua comb invention, further showing a preferred presentation angle of the water spray relative to the longitudinal axis of the on-off valve and the rotating hose nut, as well as preferred means of connection between the comb member to the spray body.

15. For example, if comb member 15 is three inches wide, then spray body 13 may be three-and-three-fourths inches wide. Depending on what the pool water filter 21 size is, the comb member 15 and spray body 13 widths may be adjusted to allow better mechanical interfacing with the filter's hard-to-reach valleys 24.

The spray body 13 may have different hose nuts 11 with seal for attaching the aqua comb 20 to various size water hoses 10. The spray body 13 may have an in-line on/off valve 12 which may be either a ball, butterfly, or gate valve type.

I claim:

1. An apparatus for use with a fluid delivery hose to clean reusable pool water filters and like design filter cartridges having a pleated construction with valleys between folded pleats of filter material positioned around a center tower, said apparatus comprising:
   a hose nut configured for attachment to a hose fitting, said hose nut having an internal seal;
   an on/off valve in fluid communication with said hose nut and configured to control the flow rate of fluid supplied by a hose connected to said hose nut;
   a rigid and elongated fluid spray body in fluid communication with said on/off valve and having a plurality of fluid spray openings providing a fluid spray with a wide and flat fluid flush pattern; and
   a semi-rigid comb member having a plurality of long and distally-narrowing fingers, said comb member connected to said fluid spray body in a position placing said long and distally-narrowing fingers below said fluid spray openings, allowing said fingers to receive and carry fluid spray from said openings between folded pleats and into the valleys located close to the center tower in reusable pool water filters and like design filter cartridges while concurrently allowing mechanical interfacing of said fingers with the sides of folded pleats and the valleys between them, wherein when said fingers are positioned between the pleats of a reusable pool water filter or like design filter cartridge, said fingers separate adjacent ones of said pleats allowing said semi-rigid fingers and the water carried thereon to loosen and mechanically dislodge imbedded debris from the folded pleats and its valleys without damage to filter material while additional fluid spray above said fingers with the assistance of gravity downwardly flushes debris from the folded pleats, preventing accumulation of dislodged debris on filter material.

2. The apparatus as in claim 1 wherein the longitudinal axis of said hose nut is the same as that of said on-off valve, and said fluid spray openings discharge fluid at a non-zero presentation angle relative to said longitudinal axis of said hose nut and said on-off valve.

3. The apparatus as in claim 2 wherein said presentation angle is adjustable.

4. The apparatus as in claim 3 wherein said fluid spray openings are selected from a group consisting of holes and slots.

5. The apparatus as in claim 4 wherein said on-off valve is selected from a group consisting of ball valves, butterfly valves, and gate valves.

6. The apparatus as in claim 5 wherein said comb member has a detachable connection to said fluid spray body.

7. The apparatus as in claim 1 wherein said fluid spray openings have an adjustable presentation angle.

8. The apparatus as in claim 7 wherein said fluid spray openings are selected from a group consisting of holes and slots.

9. The apparatus as in claim 8 wherein said on-off valve is selected from a group consisting of ball valves, butterfly valves, and gate valves.

10. The apparatus as in claim 9 wherein said comb member has a detachable connection to said fluid spray body.

11. The apparatus as in claim 1 wherein said fluid spray openings are selected from a group consisting of holes and slots.

12. The apparatus as in claim 11 wherein said on-off valve is selected from a group consisting of ball valves, butterfly valves, and gate valves.

13. The apparatus as in claim 12 wherein said comb member has a detachable connection to said fluid spray body.

14. The apparatus as in claim 1 wherein said on-off valve is selected from a group consisting of ball valves, butterfly valves, and gate valves.

15. The apparatus as in claim 14 wherein said comb member has a detachable connection to said fluid spray body.

16. The apparatus as in claim 1 wherein said comb member has a detachable connection to said fluid spray body.

17. A method for using the apparatus of claim 1 to clean a pool water filter having a pleated construction with valleys between its pleats, said method comprising the steps of:
   providing said apparatus of claim 1, a fluid delivery hose, and a pool water filter having external pleats;
   connecting said hose nut and seal of said apparatus to said fluid delivery hose;
   holding said apparatus with said fluid spray openings above said long and distally-narrowing fingers;
   inserting said long and distally-narrowing fingers between said pleats until they reach the valleys between the pleats; and
   using said long and distally-narrowing fingers to mechanically dislodge debris while fluid entering the valleys between pleats on top of said long and distally-narrowing fingers flushes the dislodged debris from said reusable pool water filter.

18. The method as in claim 17 wherein said fluid spray openings in said apparatus are selected from a group consisting of holes and slots.

19. The method as in claim 17 wherein said on-off valve of said apparatus is selected from a group consisting of ball valves, butterfly valves, and gate valves.

20. The method as in claim 17 wherein said comb member of said apparatus has a detachable connection to said fluid spray body.

* * * * *